United States Patent

[11] 3,617,636

[72] Inventor Takashi Ogihara
Tokyo-to, Japan
[21] Appl. No. 859,800
[22] Filed Sept. 22, 1969
[45] Patented Nov. 2, 1971
[73] Assignee Nippon Electric Company, Limited
Minato-ku, Tokyo-to, Japan
[32] Priority Sept. 24, 1968
[33] Japan
[31] 43/68952

[54] PITCH DETECTION APPARATUS

15 Claims, 20 Drawing Figs.

[52] U.S. Cl. .......... 179/1 SA
[51] Int. Cl. .......... G10l 1/04
[50] Field of Search .......... 179/1 SA, 15.55 R; 324/77 A, 77 B, 77 E

[56] References Cited

UNITED STATES PATENTS

| | | | |
|---|---|---|---|
| 2,627,541 | 2/1953 | Miller | 324/77 E |
| 2,672,512 | 3/1954 | Mathes | 179/15.55 |
| 3,364,425 | 1/1968 | Peterson | 179/1 SA |
| 3,496,465 | 2/1970 | Schroeder | 179/1 SA |

*Primary Examiner*—Kathleen H. Claffy
*Assistant Examiner*—Jon Bradford Leaheeg
*Attorney*—Marn & Jangarathis

ABSTRACT: Pitch detection apparatus is disclosed in accordance with the teachings of the present invention wherein a double-pitch signal is eliminated by dividing an input speech into a plurality of frequency domains of discrete frequency ranges. The pitch frequency of the speech signal is detected and pitch pulses representative thereof are produced and combined with the frequency domains to suppress certain ones of said pulses corresponding to the double-pitch signal.

INVENTOR.
Takashi Ogihara
BY
Marn & Jangarathis
ATTORNEYS

INVENTOR.
Takashi Ogihara
BY
Marn & Jangarathis
ATTORNEYS

INVENTOR.
Takashi Ogihara
BY
Marn & Jangarathis
ATTORNEYS

PITCH DETECTION APPARATUS

This invention relates to pitch detection apparatus, and more particularly, to apparatus for the elimination of indications of double pitch in a pitch detection system.

A well-known speech bandwidth reduction system is the channel vocoder. The vocoder analyses a speech signal and transmits a coded representation thereof to a receiver at a bandwidth much reduced from that of the original speech signal. At the receiver, the coded representations are used to synthesize a speech signal which is a reasonably intelligible facsimile of the original. It is most important for precise analysis and subsequent synthesis of speech signals to accurately determine the pitch period of the speech signals, as the pitch period is vital for maintaining naturalness in synthesized speech. It is known that the pitch period of voiced sounds produced by the vocal chords is nearly constant, and unvoiced or breathed sounds have no pitch, but, rather a noise component. The voice generating mechanism can be represented by an electrical analog with the transmission characteristic of the vocal tract being represented by several resonant characteristics. Since the frequency characteristic and pitch period vary slowly in comparison to the pitch frequency, the frequency characteristic of the vocal tract and the pitch period of voiced sounds may be considered to be in a quasi-steady-state. This characteristic of the pitch period is used advantageously in vocoder pitch detectors.

The conventional devices now used to determine the pitch period are classified generally as envelope emphasis pitch detectors and self/or autocorrelation pitch detectors. In the envelope emphasis pitch detector, the pitch period is determined by well known circuitry comprising a rectifier circuit, differential circuit and waveform shaping circuit which emphasize, or detect, only the peak components of a speech signal. The output peak component signal produced by the envelope emphasis pitch detector is a manifestation of the pitch period.

The pitch period is determined in an auto correlator pitch detector by well-known logic circuitry which generates the autocorrelation function of a speech signal and detects the maximum value of the generated autocorrelation function. The signal representing the maximum value of the autocorrelation function appears at the output of the autocorrelator pitch detector and is an indication of the pitch period of the speech signal.

The aforesaid pitch detectors suffer from a common disadvantage in that the output signal generated by each pitch detector often reflects the harmonics in the speech signal and hence erroneously produce an output representative of double the pitch period rather than the actual pitch period. The likelihood of such an error is increased where the amplitude of the speech signal measured at twice the pitch frequency approximates the amplitude of the speech signal measured at the pitch frequency. It will be understood that the term "double-pitch signal" as appears hereinafter means a signal of twice the pitch frequency, and the term "double-pitch period" means the period of a signal equal to one-half the pitch period. The effect of generating a double-pitch signal as is well known to those of ordinary skill in the art, is to introduce undesirable noise components into the synthesized speech signal.

Therefore, it is an object of the present invention to provide apparatus for accurately determining the pitch period of a speech signal.

It is another object of this invention to provide apparatus for eliminating the double-pitch signal derived from a speech signal.

It is a further object of the invention to accurately determine the pitch period at the beginning and end of a speech signal where the fluctuation of the pitch period is inherently large.

Various other objects and advantages of the invention will become clear from the following detailed description of an embodiment thereof, and the novel features will be particularly pointed out in connection with the appended claims.

In accordance with this invention apparatus is provided wherein a speech signal is separated into a plurality of frequency domains, each frequency domain establishing a discrete range of frequencies within which a pitch signal derived from said speech signal may fall, and the derived pitch signal, which may contain double-pitch signal components, is combined with said discrete ranges of frequencies whereby said double-pitch signal components are inhibited, resulting in a signal that is an accurate representation of the pitch period.

The invention will be more clearly understood by reference to the following detailed description of an embodiment thereof in conjunction with the accompanying drawings in which.

Figure 4:
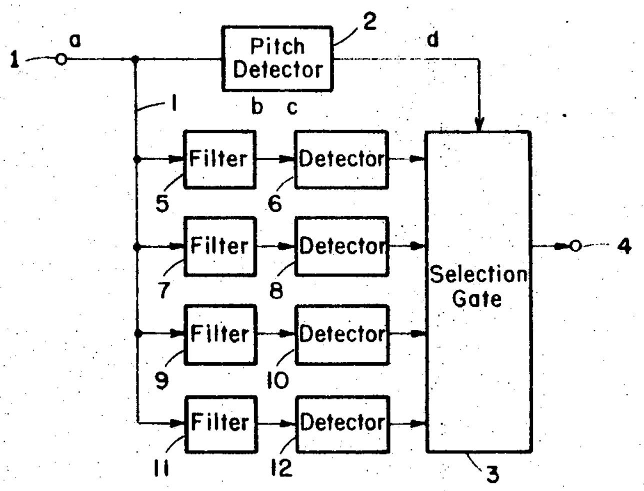
FIG. 4 is a block diagram of an embodiment of the present invention.
Figure 5:
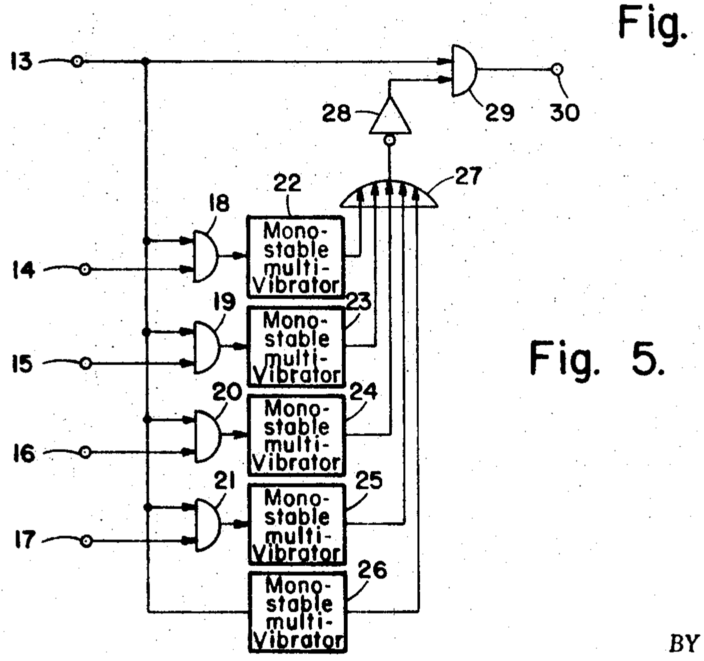
FIG. 5 is a schematic diagram of selection gate means shown in the block diagram of FIG. 4.

FIGS. *6a–6l* are diagrams illustrating the waveforms produced by the components of the apparatus represented in FIGS. 4 and 5; and FIGS. *7a–7c* are diagrams illustrating the relationship between predetermined discrete frequency ranges and the pitch frequency of an input speech signal.

Figure 1:
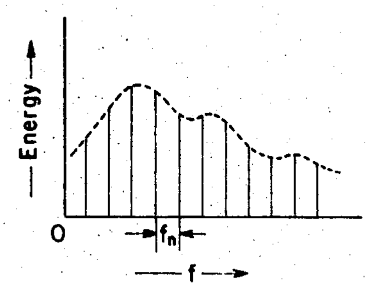
FIG. 1 is a graphical representation of the frequency spectrum of a speech waveform.

Referring now to the drawings, and in particular to FIG. 1, there is shown a graphical representation of the frequency spectrum of a speech signal with pitch frequency $f_n$. Since frequency may be expressed as the reciprocal of the period, the pitch frequency $f_n$ is the reciprocal of the pitch period $T_n$, and the well known relationship that $f_n=1/T_n$ obtains. The abscissa of the graph of FIG. 1 represents frequency $f$, and the ordinate thereof represents energy. Each discrete frequency illustrated therein is an integral multiple of the pitch frequency $f_n$. The dashed curve in FIG. 1 represents the transmission characteristic of the vocal tract. Thus, the spectrum of a speech wave can be expressed in terms of the product of the transmission characteristic of the vocal tract and the spectral energy existing at each of the integral multiples of the pitch frequency.

Figure 2:
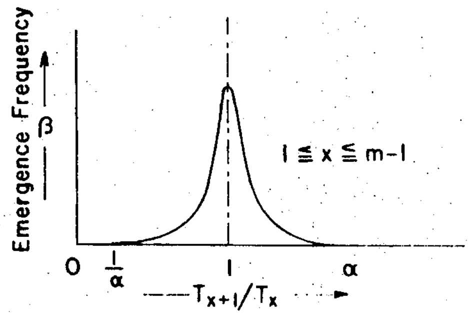
FIG. 2 is a graph illustrating the statistical frequency distribution of the ratio of two adjacent pitch periods of a continuous speech signal.

As aforesaid, the human voice generating mechanism produces speech sounds by air being forced from the lungs through the larynx. The vocal cords present in the larynx may vibrate in a manner to chop the airstream passing therethrough at a rate which corresponds to the pitch frequency. If the vocal chords vibrate, a fundamental frequency proportional to the pitch frequency is imparted to the speech signal, and the speech signal is termed "voiced." If, on the other hand, the vocal chords do not vibrate, the speech signal is produced by simple breath noise (e.g., *s* and *ch*) and the speech signal is termed "unvoiced." For a continuous, voiced speech signal, the pitch frequency of two adjacent periods of the speech signal are approximately the same, and if the pitch frequency of a given period is known, the pitch frequency of the next succeeding period will not exceed certain limits. Referring to FIG. 2, which illustrates a statistical frequency distribution of the ratio of two adjacent pitch periods of a continuous speech signal, the abscissa represents the ratio of the pitch frequency of the next succeeding period to the pitch frequency of the given period and the ordinate represents the pitch frequency $\beta$. Assuming here that the total number of pitch periods in a continuous voiced speech signal is m, then the xth pitch period is designated $T_x$ and the immediately succeeding pitch period is $T_x+_1$. The ratio $T_x+_1/T_x$ has the distribution as shown in FIG. 2. It is known that $\beta$ is very small when the value of $T_x+_1/T_x$ is greater than 1.25 (hereinafter $1.25=\alpha$) and smaller than 1/1.25 ($1/\alpha$).

Figure 3:
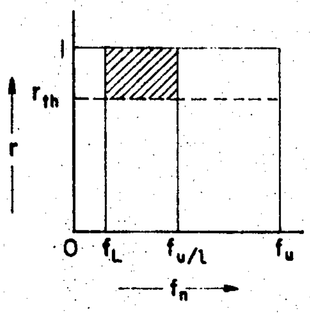
FIG. 3 illustrates graphically the pitch frequency range within which the double-pitch signal has the greatest probability of being detected by conventional pitch detectors.

Turning now to FIG. 3, the pitch frequency range wherein a double-pitch signal has the greatest probability of being detected is graphically illustrated. The abscissa of the graph represents the pitch frequency $f_n$ of a speech signal and the ordinate represents the autocorrelation function $r$ of a speech signal. The minimum pitch frequency of a speech signal produced by a human voice generating mechanism is $f_L$ and the maximum pitch frequency is $f_u$. The threshold autocorrelation function of a speech signal is $r_{th}$. If the autocorrelation function of a speech signal is above the threshold level, the speech is "voiced", while if the autocorrelation function falls below the threshold level, the speech is "unvoiced" wherein the terms voiced and unvoiced are defined above. If a conventional envelope emphasis pitch detector is used to determine the pitch period of a speech signal, then the pitch frequency range where there is a possibility of detecting the double-pitch signal has been found to be between $f_L$ and $f_u/2$ regardless of the value of the autocorrelation function $r$. However, if an autocorrelation pitch detector is used to determine the pitch period of a speech signal, then the autocorrelation function of the speech signal is directly determinative of the pitch period. The pitch frequency range where there is a possibility of detecting the double-pitch signal by an autocorrelation pitch detector is shown by the cross-hatched area of FIG. 3.

As mentioned above, the ratio of adjacent pitch periods of a continuous speech signal is constrained to the limits 1/1.25 and 1.25. Hence, the range of the pitch period $T_n+_1$ which immediately succeeds pitch period $T_n$ may be expressed as $$\frac{T_n}{1.25} \leq T_{n+1} \leq 1.25\,T_n \qquad (1)$$

It is a feature of the present invention to provide logic circuitry which performs a logic operation based on equation (1) to establish the range of the expected pitch period $T_{n+}1$. This logic circuitry may be used with a conventional pitch detector of either the envelope emphasis etc., autocorrelation type whereby an accurate eperiod is determined with the double-pitch period removed, in the manner as will hereinafter be explained.

FIG. 4 is is a block diagram of an embodiment of the present invention comprising pitch detector means 2, selection gate means 3, filter means 5, 7, 9 and 11 and detector means 6, 8, 10 and 12. Pitch detector means 2 may take the form of any conventional pitch detector such as an envelope emphasis pitch detector or an autocorrelation pitch detector. The pitch detector 2 is provided with a speech signal by input terminal 1 and determines the pitch period thereof. Filter means 5, 7, 9 and 11 may be either low-pass or band-pass filters and are connected in parallel relation to input terminal 1. For purposes of the discussion to follow, the filters are assumed to be low-pass filters. Each low-pass filter is connected in series with a corresponding detector, 6, 8, 10 and 12, which may be a well-known diode detector or rectifier, and each detector is connected to selection gate 3 at an individual input thereto. Selection gate means 3 is further connected to pitch detector 2.

Selection gate 3 will be described in detail below in conjunction with FIG. 5, and thus it is sufficient at this point in the description of FIG. 4 to merely note that selection gate 3 functions in accordance with equation (1) and passes the pitch information produced by pitch detector 2 to output terminal 4 only if the pitch information falls within the expected pitch period range defined by equation (1).

Figures 6A, 6B, 6C, 6D, 6E, 6F, 6G, 6H, 6I, 6J, 6K, 6L:
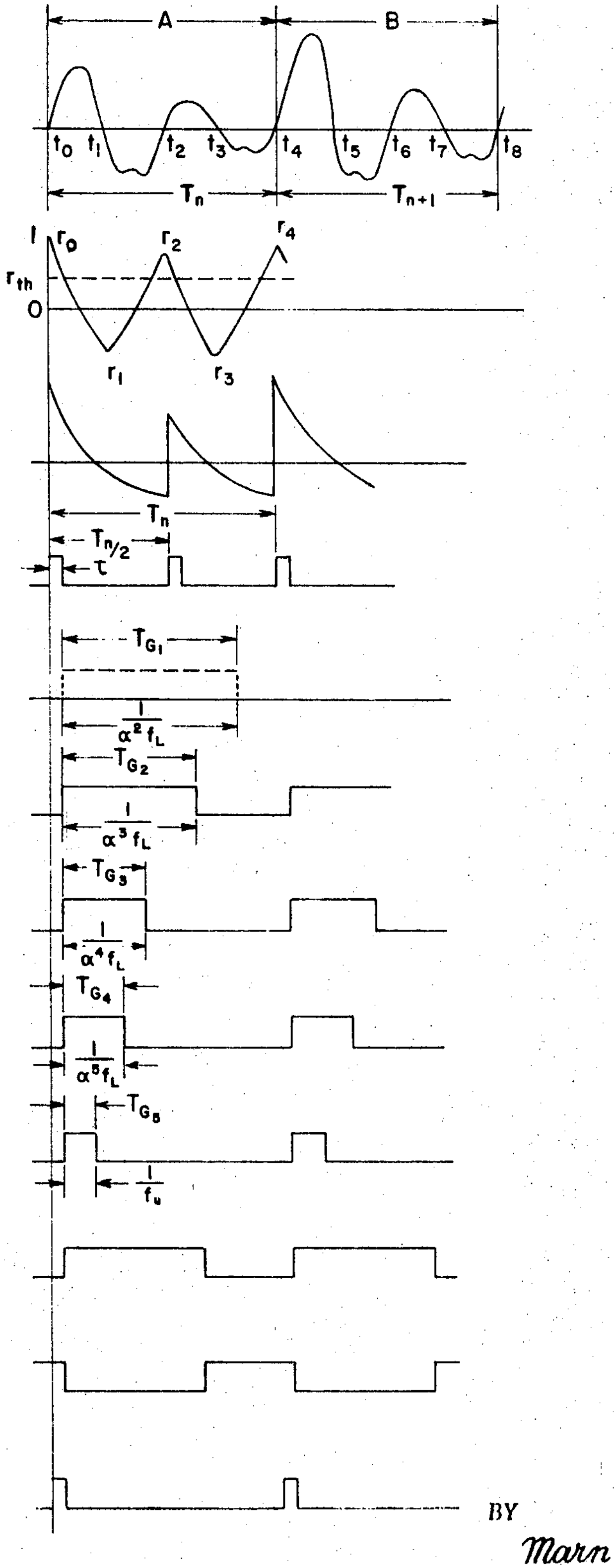

A brief summary of the operation of the apparatus of FIG. 4 is now set forth in conjunction with the waveforms of FIGS. **6*a*–6*1* to familiarize the reader therewith, however, the detailed operation thereof will be considered below. A speech signal of the type illustrated in FIG. 6*a* is applied to terminal 1. In response thereto the pitch detector 2 produces pulses at the zero crossing points of the speech signal in the well-known manner. The frequency of the pulses produced by the pitch detector 2 indicates the fundamental frequency of the speech signal and is proportional to the pitch frequency thereof. These pulses are shown in FIG. 6*d*. It will be appreciated from an inspection of FIG. 6*d* that if the pitch frequency of the input speech signal is $1/T_n$, double-pitch pulses of frequency $2/T_n$ are produced by pitch detector 2, due to the zero crossing point $t_2$ shown in FIG. 6*a*. The double-pitch pulse is eliminated in the following manner. The fundamental frequency of the speech signal is detected by the filter-detector combination of FIG. 4 comprising filters 5, 7, 9 and 11 coupled to detectors 6, 8, 10 and 12 respectively, in a manner described below. Since the fundamental frequency can vary from period-to-period and from person-to-person, a plurality of filters and detectors is required to establish the permissible ranges of fundamental frequency. The pitch pulses produced by pitch detector 2 are compared to the detected fundamental frequency. If the pulse frequency exceeds the fundamental frequency then the double-pitch pulses contained therein are inhibited. Selection gate 3 compares the pulses produced by pitch detector 2 with the fundamental frequency of the speech signal detected by the filter-detector combination and suppresses the double-pitch pulses in a manner hereinafter described. The pitch pulses appearing at output terminal 4 of selection gate 3 are shown in FIG. 6(1). A more detailed description of the operation of the apparatus of FIG. 4 now follows, taken in conjunction with the waveforms of FIGS. 6*a*–6*d* which aid in explaining said operation. FIG. 6*a* depicts a portion of a continuous, voiced speech signal applied to input terminal 1 of FIG. 4. The speech signal is shown separated into two successive pitch periods designated sections A and B respectively. The zero crossing times of the waveform, are designated $t_o, t_1, \ldots t_8$. The duration of pitch period $T_n$ of section A extends from $t_o$ to $t_4$ and the duration of pitch period $T_{n+}1$ of section B, the immediately succeeding pitch period, extends from $t_4$ to $t_8$. The waveform of FIG. 6*a*** is typical of those speech signals wherein a double-pitch signal may be detected. The double-pitch period is $T'_n/2$ and extends from $t_o$ to $t_2$.

FIG. **6*b* is a waveform of the autocorrelation function $r$ of the speech signal of FIG. 6*a*. The autocorrelation function is used in a conventional autocorrelation pitch detector to determine the pitch period of a speech signal. An example of the operation of a conventional autocorrelation pitch detector, which may comprise pitch detector 2 of FIG. 4, will now be described. An input speech signal, is converted into a zero crossing signal shown in FIG. 6*a* by passing the speech signal through an infinite limiter not shown. Amplitude variations are thus eliminated and only zero crossing information is retained. The zero crossing signal is then sampled P times from time $t_o$ to $t_4$, and the samples are stored in a memory circuit of well-known design not shown. Thus if FIG. 6*a* is considered it will be appreciated that samples taken in the interval $t_o$ to $t_1$ are positive, the samples obtained in the interval $t_1$ to $t_2$ are negative and the sequence is repeated from $t_2$ to $t_3$, and from $t_3$ to $t_4$. As the zero crossing signal is being sampled, samples 1 to P are compared to samples 1 to P, then to samples 2 to P+1, then to samples 3 to P+2, etc. in a well-known manner. The result of this comparison is the autocorrelation function $r$ shown in FIG. 6*b*. Autocorrelation function $r$ is a measure of how the waveform section A of FIG. 6*a* compares with itself for a period of time $T_n$. At time $t_o$ the autocorrelation function $r$ is $r_o$ which is equal to At time $t_2$ the autocorrelation function is $r_2$; at time $t_3$ the autocorrelation function is $r_3$; and at time $t_4$ the autocorrelation function is $r_4$, as shown. The autocorrelation pitch detector generates a positive pulse when the autocorrelation function exceeds the threshold limit $r_{th}$. As mentioned above $r_{th}$ is the voiced/unvoiced threshold. These pulses indicate the pitch period of the speech signal. As shown in FIG. 6*d*, the autocorrelation pitch detector produces pulses at times $t_o$, $t_2$ and $t_4$ when the autocorrelation function is equal to $r_o$, $r_2$ and $r_4$ respectively. The pulse at time $t_2$ indicates the double-pitch period $T_n/2$. Thus autocorrelation pitch detector 2 produces a double-pitch signal for an input speech signal of the waveform shown in FIG. 6*a***.

If pitch detector 2 of FIG. 4 should comprise a conventional envelope emphasis pitch detector, as described by Gruenz, Jr. and Schoot in "Extraction and Portrayal of Pitch of Speech Sounds" 21 Jour. Acous. Soc. Amer. 487,490–491 rather than the autocorrelation pitch detector discussed above; an amplitude envelope will be generated from the speech signal, in the manner shown in FIG. 6c. The envelope corresponds to the zero crossings of the speech signal. The maximum amplitudes of the envelope are used to generate pulses in a well-known manner, as shown in FIG. 6d. Thus, this form of pitch detector will also produce, a double-pitch signal for an input speech signal having the waveform shown in FIG. 6a and hence either the autocorrelation pitch detector or the envelope emphasis pitch detector may be used as the pitch detector 2 as each of these pitch detectors act to produce the output waveform shown in FIG. 6d.

It is here noted that the waveforms illustrated in FIGS. 6a–61 have been somewhat simplified for purposes of explanation in that the time delays inherent in the apparatus of FIG. 4 have not been included. This has been done because the inclusion of the time delays would unnecessarily confuse the drawing.

Returning now to FIG. 4, low pass filters 5, 7, 9 and 11 have cutoff frequencies of $\alpha f_L$, $\alpha^2 f_L$, $\alpha^3 f_L$ and $\alpha^4 f_L$, respectively, where $\alpha$=1.25 and $f_L$ is the minimum pitch frequency produced by a human voice generating mechanism. Detectors 6, 8, 10 and 12 detect the signals produced by filters 5, 7, 9 and 11, respectively, thereby determining the lowest frequency component of the input speech signal and selectively passing that component as well as each higher order component thereafter in the ordered filter array defined thereby. For example, an output produced by detector 6 indicates that the lowest speech frequency is below $\alpha f_L$. Likewise, if detector 6 produces no output but detector 8 produces an output signal, this indicates the lowest speech frequency is above $\alpha f_L$, but below $\alpha^2 f_L$. The frequency indications produced by the detectors, which may be DC signals, are applied to selection gate 3 where they are combined with the pitch detector output from pitch detector 2 in a manner to be described, resulting in an accurate determination of the pitch frequency of a speech signal, with the double-pitch period removed.

FIG. 5 is a logic circuit diagram of the selection gate 3 of FIG. 4 and comprises AND-gates 18–21, monostable multivibrators 22–26, OR-gate 27 and AND-gate 29. The frequency information produced by detectors 6, 8, 10 and 12 as described above are applied to first inputs of AND-gates 18–21 by input terminals 14–17, respectively. Second inputs of the AND-gates 18–21 are provided by the pitch frequency pulses produced by pitch detector 2 which is connected to terminal 13. These pulses are shown in FIG. 6d and are applied to the AND-gates by terminal 13. The signals produced by AND-gates 18–21 are applied to monostable multivibrators 22–25 as triggering signals. The pulses produced by pitch detector 2 are directly applied as triggering signals for monostable multivibrator 26 by terminal 13. The pulse durations or duty-cycles of the monostable multivibrators vary in a manner to be described, and are combined in OR-gate 27. The signal produced by OR-gate 27 is inverted in inverter 28 and gated with the pitch pulses applied to terminal 13 in AND-gate 29. Output terminal 30 of AND-gate 29 corresponds to the output terminal 4 of selection gate 3 in FIG. 4.

The operation of FIG. 5 will now be described in conjunction with the waveforms of FIGS. 6d–61. The frequency information applied to terminals 14–17 by detectors 6, 8, 10 and 12 are gated with the pitch pulses applied to terminal 13 by pitch detector 2 in AND-gates 18-21. As shown in FIG. 6d the pitch pulse is of pulse duration equal to $\tau$. Coincidence between the pitch pulse and the frequency information results in a pulse of width $\tau$ at the output of the AND-gates 18–21. If the lowest speech signal frequency is above the cut-off frequency of one of the low pass filters of FIG. 4, that filter and the filters shown above it in FIG. 4 produce no output signal and the outputs of the corresponding AND-gates of FIG. 5 are zero. For example, if the lowest frequency of the speech signal is between $\alpha^2 f_L$ and $\alpha^3 f_L$, filters 5 and 7 produce no output signal, and AND-gates 18 and 19 have zero output. However, filters 9 and 11 produce output signals and pulses of width $\tau$ are generated by AND-gates 20 and 21.

Monostable multivibrators 22–25 are triggered by the pulses generated by AND-gates 18–21 and produce pulses of varying width. Monostable multivibrator 22 produces a pulse of width $1/(\alpha^2 f_L)$, monostable multivibrator 23 produces a pulse of width $(\alpha^3 f_L)$, etc., as shown in FIGS. 6e–6h. Monostable multivibrator 26 produces a pulse of width $1/f_u$ shown in FIG. 6i, where $f_u$ is the maximum pitch frequency of a speech signal produced by a human voice generating mechanism. It is seen that the maximum pulse width produced by the monostable multivibrators is dependent upon the signals produced by AND-gates 18–21 which, in turn, are dependent upon the lowest frequency of the speech signal. The output of OR-gate 27 is a pulse of duration equal to the duration of the widest pulse produced by the triggered monostable multivibrators 22–26. Inverter 28 and AND-gate 29 act to inhibit a double-pitch pulse by the pulse output of OR-gate 27. Thus it is seen, that as the pitch frequency of a speech signal varies, the duration of the pulse produced by OR-gate 27 varies. Each pulse duration corresponds to a range of expected pitch frequencies and is greater than the double-pitch period within that range, but less than the pitch period.

Figure 7A:
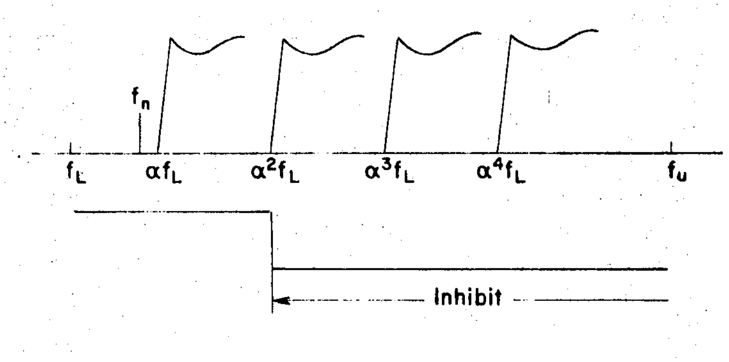
Figure 7B:
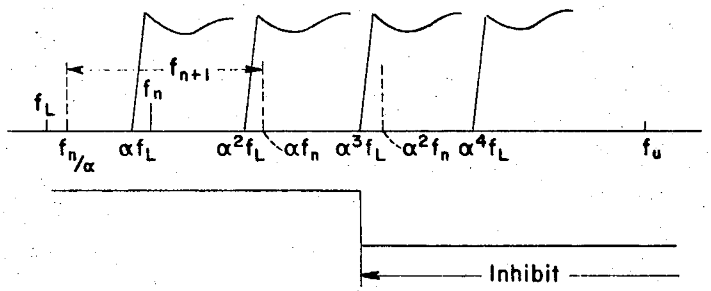

An illustrative example of the operation of the apparatus of FIGS. 4 and 5 will now be described. FIG. 7b graphically illustrates the cut-off frequencies of the low pass filters 5, 7, 9 and 11 as $\alpha f_L$, $\alpha^2 f_L$, $\alpha^3 f_L$ and $\alpha^4 f_L$, respectively. $f_L$ and $f_u$ along the abscissa of the graph are the lowest and highest pitch frequencies, respectively, that are produced by the human voice generating mechanism. If it is assumed that the pitch frequency of a speech signal is $f_n$ as shown in FIG. 7b, then the pitch frequency of the immediately succeeding pitch period is $f_{n+}1$. In accordance with equation (1), frequency $f_{n+}1$ will fall within the range $f_n/\alpha$ to $\alpha f_n$ as shown by dotted lines in FIG. 7b. Assuming pitch frequency $f_{n+}1$ is the worst case or $f_n/\alpha$, then the double-pitch frequency of $f_n/\alpha$ is $(f_n/\alpha)$ X2. Since $\alpha$ =1.25, then $\alpha^3$ is approximately 2 and $(f_n/\alpha)\ X2 \simeq (f_n/\alpha)\ X\alpha^3 = \alpha f_n$. This double-pitch frequency is shown by dotted lines between $\alpha^3 f_L$ and $\alpha^4 f_L$ in FIG. 7b.

Since the assumed pitch frequency $f_n$ is between $\alpha f_L$ and $\alpha^2 f_L$, the lowest speech signal frequency will be greater than the cut-off frequency $\alpha f_L$ of filter 5 of FIG. 4. Therefore, detector 6 will produce no output signal. However, detectors 8, 10 and 12 will produce signals indicating that the speech signal frequency is below the cut-off frequencies of filters 7, 9 and 11, respectively. Therefore, going signals appear at terminals 15–17 but not at terminal 14 of FIG. 5. The occurrence of a pitch pulse, produced by pitch detector 2, at terminal 13 results in the production of triggering pulses by gates 19–21. The triggering pulses cause monostable multivibrators 23–26 to produce pulses of varying widths, $1/(\alpha^3 f_L)$, $1/(\alpha^4 f_L)$, $1/(\alpha^5 f_L)$, and $1/f_u$ respectively. Monostable multivibrator 22 does not generate its pulse of width $\alpha 2 f_L$ because AND-gate 18 does not produce a triggering pulse. The monostable multivibrator pulses are illustrated in FIGS. 6e–6i. OR-gate 27 produces a pulse whose duration is the largest of the pulse widths of the monostable multivibrator pulses, i.e., $\alpha 3 f_L$, shown in FIG. 6j. This pulse is inverted by inverter 28 and appears as in FIG. 6k. The inverted pulse is gated with the pitch pulse of FIG. 6d. As is readily seen, the double-pitch pulse coincides with the inverted pulse and is inhibited by gate 29. Thus, only the pitch pulses pass through gate 29 to the output terminal 30 as shown by FIG. 61.

Figure 7C:
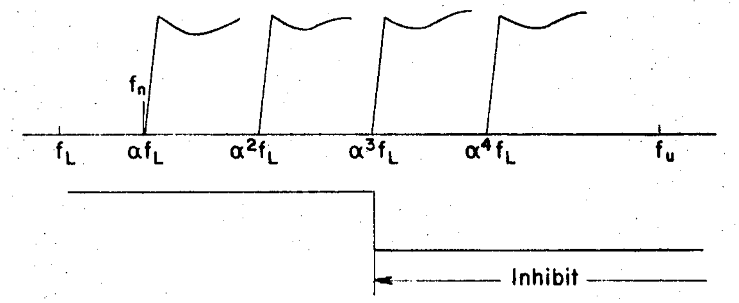

It is readily apparent that the double-pitch frequency of the pitch signal of frequency $f_{n+}1 = \alpha f_n$ is also suppressed. In like manner, the apparatus of the present invention eliminates the double-pitch signal for the immediately succeeding pitch period where the pitch frequency $f_n$ is less than $\alpha f_L$, as shown in FIG. 7a, and where $f_n$ is equal to $\alpha f_L$ as shown in FIG. 7c.

While the invention has been particularly shown and described with reference to a specific embodiment thereof, it will be obvious to those skilled in the art that the foregoing and various other changes and modifications in form and details may be made therein without departing from the spirit and scope of the invention. It is, therefore, the aim of the appended claims to cover all such changes and modifications.

What is claimed is:

1. Pitch detection apparatus comprising:

first means adapted to receive a speech signal whose pitch is to be determined;

second means coupled to said first means for generating indications of the pitch frequency of said speech signal and of the double-pitch frequency of said speech signal;

third means coupled to said first means for separating said speech signal into a plurality of frequency domains of discrete frequency ranges to detect an indication of a fundamental frequency of said speech signal; and fourth means coupled to said second and said third means for comparing said pitch and said double-pitch frequency indications with said fundamental frequency indication to inhibit said double-pitch indication in an output of said fourth means when said pitch and said double-pitch frequency indications exceed said fundamental frequency indication.

2. The pitch detection apparatus of claim 1 wherein said third means comprises a plurality of filter means, each having an input coupled to said first means and including an output; and pulse generating means having an input coupled to said filter means outputs and including an output connected to an input of said fourth means.

3. The pitch detection apparatus of claim 2 wherein said fourth means comprises gate means having an input constituting said fourth means input connected to said pulse generating means output said gate means including another input connected to an output of said second means.

4. The pitch detection apparatus of claim 3 wherein said pulse generating means comprises a plurality of pulse generators each producing a pulse having a duration corresponding to one of said frequency ranges, and each coupled to said output of one of said filter means.

5. The pitch detection apparatus of claim 4 wherein said pulse generators comprise monostable multivibrators and said gate mans comprises an OR-gate coupled to each of said monostable multivibrators, said OR-gate having an output coupled to an input of a coincidence gate, said coincidence gate having a further input coupled to said output of said second means.

6. The pitch detection apparatus of claim 5 wherein said monostable multivibrators are coupled to said output of each of said filter means by a plurality of AND-gates, said AND-gates being activated by said second means.

7. The pitch detection apparatus of claim 6 wherein said second means comprises envelope emphasis pitch detection means.

8. The pitch detection apparatus of claim 6 wherein said second means comprises autocorrelation pitch detection means.

9. Apparatus for eliminating indications of double pitch which may be produced in a speech analysis system comprising;

first means responsive to a speech signal for detecting the frequency thereof;

second means responsive to said speech signal for detecting additional frequencies thereof;

third means coupled to said first and second means and responsive to the outputs thereof for producing inhibiting signals proportional to the detected additional frequencies;

and fourth means coupled to said first means and said third means and responsive to the outputs thereof, to inhibit said indications of double pitch.

10. The apparatus of claim 9 wherein said second means comprises a plurality of filter means to detect the lowest frequencies of said speech signal, each of said filter means detecting correspondingly higher frequencies and producing an output indicative thereof.

11. The apparatus of claim 10 wherein said third means comprises means coupled to said plurality of filter means for generating a plurality of pulses of discrete pulse widths, said pulse widths being inversely proportional to said respective detected frequencies.

12. The apparatus of claim 11 wherein said means for generating a plurality of pulses comprises a plurality of monostable multivibrators, each coupled to one of said plurality of filter means and responsive to the output thereof.

13. The apparatus of claim 12 wherein said third means comprises inhibit gate means having a plurality of inputs, one of said inputs being coupled to said plurality of monostable multivibrators and responsive to the pulse of greatest width generated thereby, and another of said inputs being coupled to said first means.

14. The apparatus of claim 13 wherein said first means comprises autocorrelation pitch detection means.

15. The apparatus of claim 13 wherein said first means comprises envelope emphasis pitch detection means.

* * * * *